United States Patent [19]

Kramer

[11] 3,770,291
[45] Nov. 6, 1973

[54] VEHICLE SUSPENSION
[75] Inventor: James H. Kramer, Akron, Ohio
[73] Assignee: The B. F. Goodrich Company, New York, N.Y.
[22] Filed: Mar. 17, 1972
[21] Appl. No.: 235,505

[52] U.S. Cl. .................... 280/124 B, 267/57.1 P
[51] Int. Cl. ............................................ B60g 11/20
[58] Field of Search ................ 280/124 B, 124 R; 267/57.1

[56] References Cited
UNITED STATES PATENTS
2,577,761  12/1951  Hickman.................. 267/57.1 R Primary Examiner—Philip Goodman
Attorney—R. A. Johnston et al.

[57] ABSTRACT

A suspension of the type having the weight of the vehicle supported by torsion springs. A rigid shaft is disposed longitudinally of the vehicle adjacent each wheel. Three torsion springs are disposed in longitudinally spaced relationship about each shaft and each spring has an annulus of elastomer as the yieldable portion. Each spring has a rigid outer shell received over the elastomer annulus. A rigid arm is attached to the outer shell of the end springs to connect them resiliently in parallel. Additional arms are rigidly cantilevered from each end of each shaft. In one form of the suspension, the free ends of the arms from the shaft are pivotally connected through shackles to the vehicle frame and the free ends of the arms from the springs secured to the wheel axle. In another form of the suspension, the outer shells of the springs are secured to the vehicle frame and the free end of the arms from the shaft pivotally connected to the axle of the wheel. The center spring has the free end of the arm attached to its outer shell secured to the wheel axle in the first-mentioned form and secured to the vehicle frame in the latter form. Adjustment means are provided on the attachment of the center spring arm for preloading the center spring.

11 Claims, 10 Drawing Figures

Fig. 1

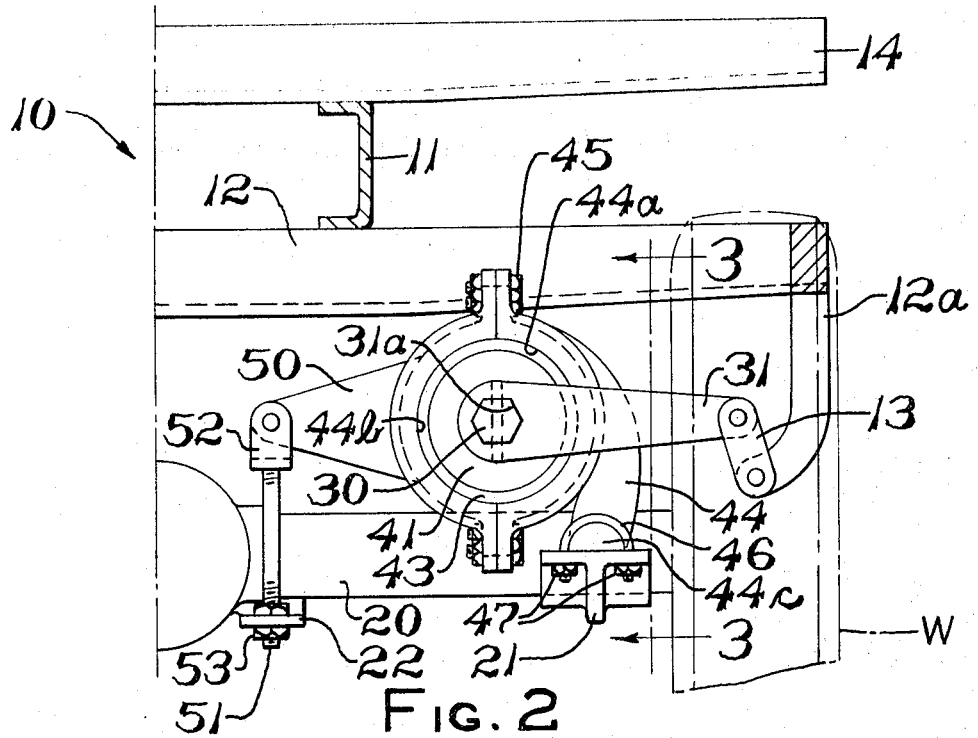
Fig. 2
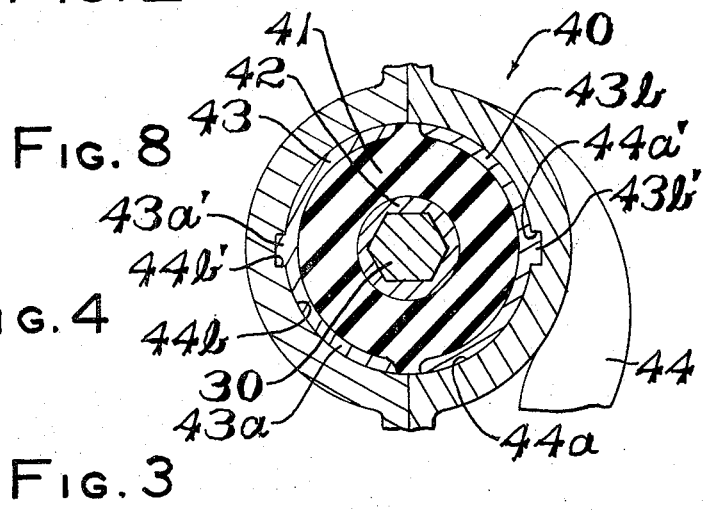
Fig. 8
Fig. 4
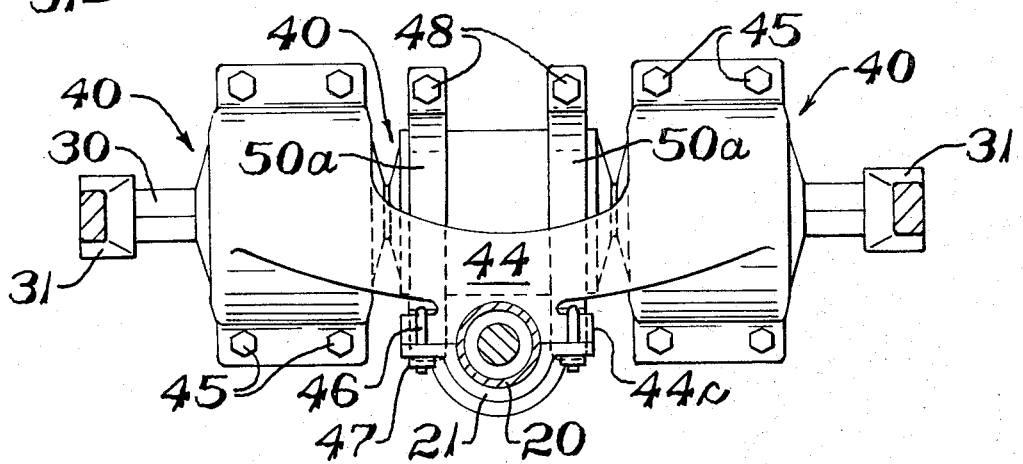
Fig. 3

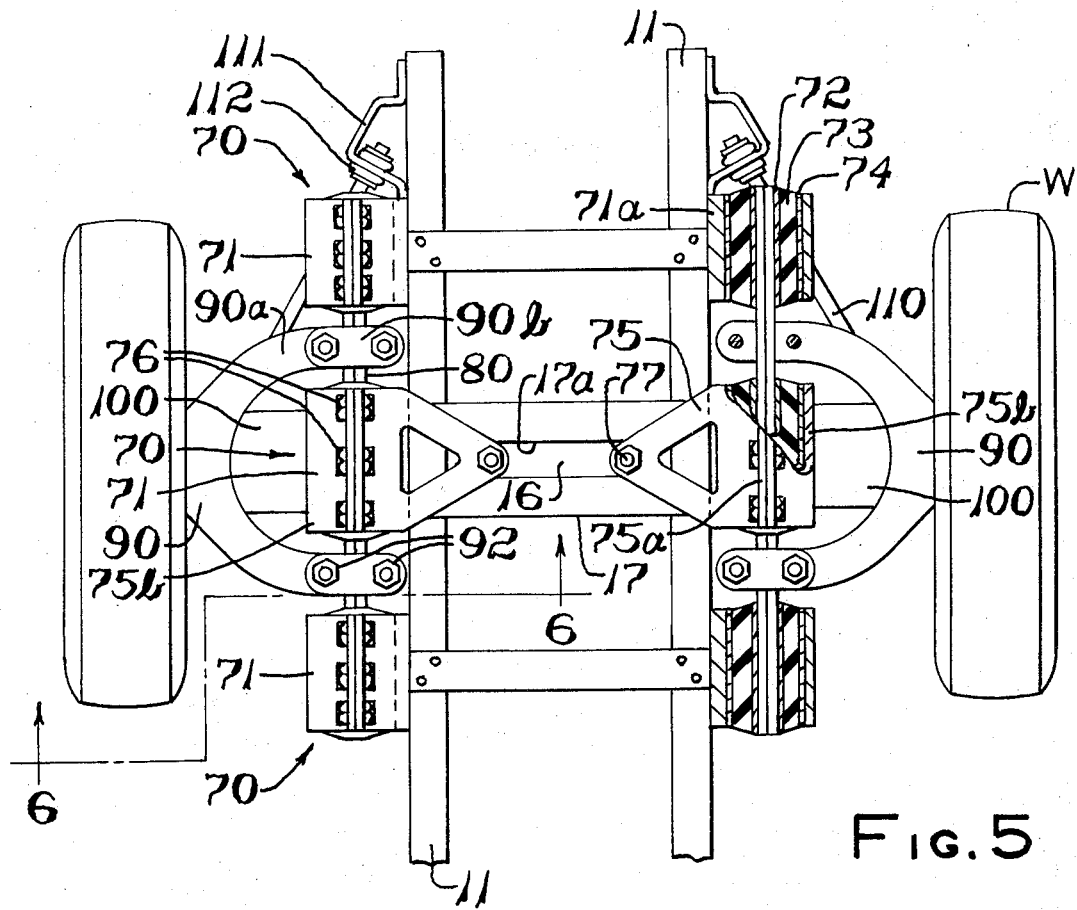
Fig. 5
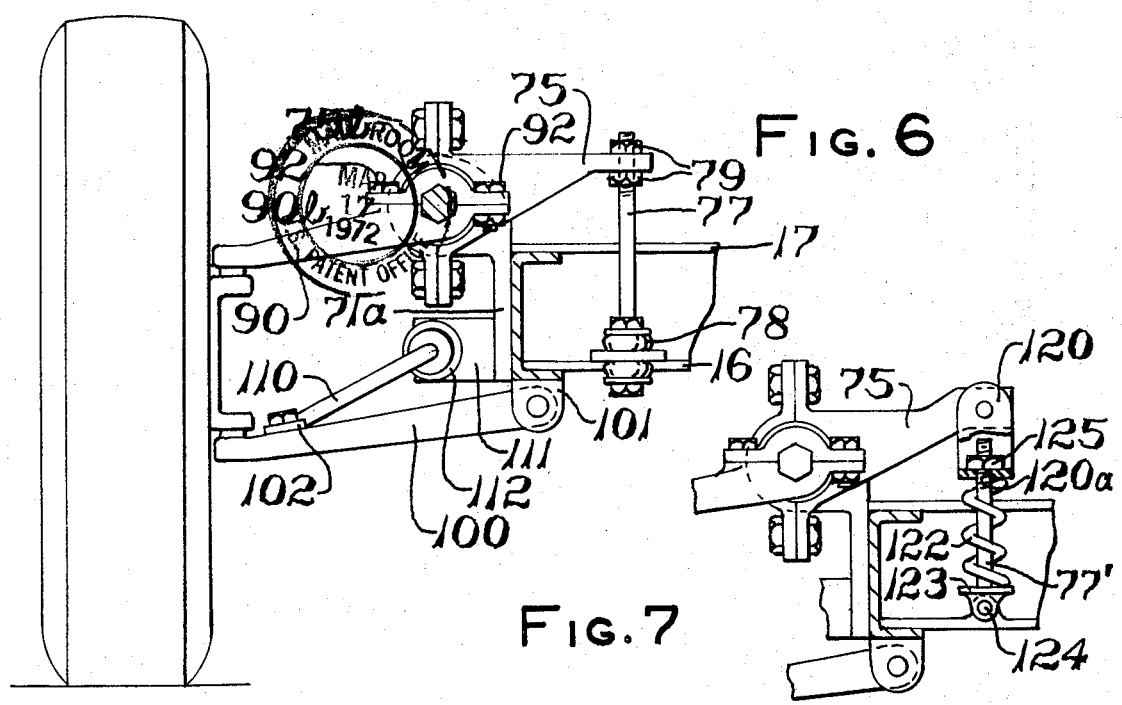
Fig. 6
Fig. 7

VEHICLE SUSPENSION

BACKGROUND OF THE INVENTION

In designing suspensions for buses and trucks and other commercial vehicles, it has long been desirable to provide a suspension having a high degree of resiliency and yet one which is capable of sustaining the heavy loads encountered in commercial vehicles. Vehicles of this type are often required to carry loads which result in gross vehicle weight of the order or in excess of twice the empty vehicle weight. Thus, to design a suspension which is sufficiently resilient to provide adequate response vehicle control when running empty, and yet perform in a similar manner under the weight of the vehicle when fully loaded, presents an anomalous situation to the suspension designer.

Heretofore, various mechanical expedients have been posed to provide additional springing capacity to the suspension when the vehicle is in the fully loaded state. These expedients have generally included auxiliary helper springs which engage the axle of the wheel upon predetermined deflection of the primary suspension members and mechanical means for varying the load on the springs by deflecting the springs with auxiliary mechanisms other than by movement of primary linkages of the vehicle suspension. The foregoing techniques generally require the use of large and cumbersome auxiliary springs and mechanical devices for deflecting the spring. These result in a suspension system requiring a substantial volume of space, with respect to the wheel well area of the vehicle chassis, which reduces the available space on a vehicle chassis of a given size.

In certain applications for commercial vehicle suspensions, as, for example, in passenger-carrying highway buses, the resiliency of the suspension or quality of the ride is important throughout the load range, that is, from the empty vehicle weight through the maximum loaded weight. Where it is desired to employ springs utilizing elastomeric members as the yieldable portion without employing air bags for auxiliary load-carrying capacity, it has been heretofore difficult to design the elastomeric suspension members for adequate suspension response throughout the entire load-carrying range of the vehicle. Therefore, use of elastomeric springs for commercial vehicle suspensions has been limited. However, it has long been recognized that the elastomeric suspension springs are highly desirable in commercial vehicles such as passenger buses for their inherent ability to dampen vibrations and noise. Therefore, it has been commercially important and desirable to find a practical suspension employing elastomeric elements which would be adjustable to vary the static position of the suspension for various load conditions of the vehicle.

SUMMARY OF THE INVENTION

The present invention provides a suspension for commercial vehicles which employs elastomeric members as the yieldable element of the suspension springs. The suspension of the present invention has some of the elastomeric members adjustable to vary the static deflection of the vehicle suspension for various load conditions of the vehicle. The suspension of the present invention employs a rigid shaft disposed longitudinally adjacent each of the vehicle wheels with three torsion springs, each having an annulus of elastomer, received over the shaft with the springs in longitudinal spaced arrangement along the shaft. The inner periphery of each elastomeric annulus is rigidly secured to the shaft and the outer periphery of each elastomeric annulus has a rigid shell secured thereover with the shells rigidly attached to the suspension arms. The longitudinal outer springs have their shells attached to a common arm which is secured to the axle of the adjacent wheel. The center elastomeric spring has an arm rigidly attached to its outer shell with the arm adjustably secured to the wheel axle. An arm member is rigidly attached to each end of the shaft and extends in cantilever therefrom with the free end of each arm attached to the vehicle by shackle linkages. Vertical movement of the wheel axle causes the arms to rotate the shaft within the springs, which rotation is resiliently resisted by the elastomeric spring members. Adjustment of the attachment of the center spring arm to the axle results in rotation of the center spring with respect to the shaft and thus provides a means for preloading the suspension. This type of suspension is employed for solid-axial wheel arrangement.

Another form of the invention is provided for suspensions of the type wherein each wheel is independently suspended from the vehicle for each pair of wheels rotating about the same axle. In the latter form of the invention, the housings of the axially outer springs are rigidly attached to the vehicle frame. The suspension action is provided by rigidly attaching arm members to the shaft in the spaces intermediate the springs, with the arm members pivotally attached to the wheel axle. In this form of the invention, vertical movement of the wheel results in rotation of the shaft within the elastomeric springs which springs resist the rotation and thus suspension deflection. The outer housing or shell of the center springs have an adjustable attachment to the frame. By varying the position of the center spring to the vehicle frame, the housing of the center spring is thus rotated in respect to the shaft and a static preload is provided to the suspension.

The present invention thus provides a suspension for commercial vehicles of the type utilizing elastomeric springs. The invention employs shafts disposed adjacent each wheel with three elastomeric torsion springs received over each shaft. The shaft has arm members rigidly attached thereto which arm members are pivotally attached to the wheel axle in one embodiment and to the vehicle frame in the other embodiment. The torsion springs have outer shells attached to the suspension members in one embodiment and rigidly attached to frame of the vehicle in the other embodiment. The center spring has its outer shell adjustably secured to the wheel axle or the vehicle frame for rotating the shell and providing a preload to the suspension.

BRIEF DESCRIPTION OF THE DRAWINGS

FIG. 1 is a plan view of a vehicle chassis showing the suspension of the present invention in the form used for suspending the vehicle on a driving axle and has the torsion springs for one wheel shown in section;

FIG. 2 is a section view taken along section indicating lines 2—2 of FIG. 1 and shows a rear elevation view of a portion of the suspension of FIG. 1;

FIG. 3 is a partial section view taken along section indicating lines 3—3 of FIG. 2;

FIG. 4 is a view of the portion of the suspension of FIG. 2 and shows an alternative arrangement for securing the center spring arm to the axle;

FIG. 5 is a plan view of the suspension of the vehicle of FIG. 1 which is employed for independently suspending wheels of the same axle pair;

FIG. 6 is a partial section view taken along section indicating lines 6—6 of FIG. 5 and shows a front elevation view of the suspension of FIG. 5;

FIG. 7 is a view of a portion of the suspension of FIG. 6 which shows an alternative form of attaching the center spring arm to the vehicle frame; and FIG. 8 is a cross sectional view taken transversely of a typical torsion spring illustrating the details of the attachment of the inner and outer shells to the shaft and to the arm members.

DETAILED DESCRIPTION

Figure 1:
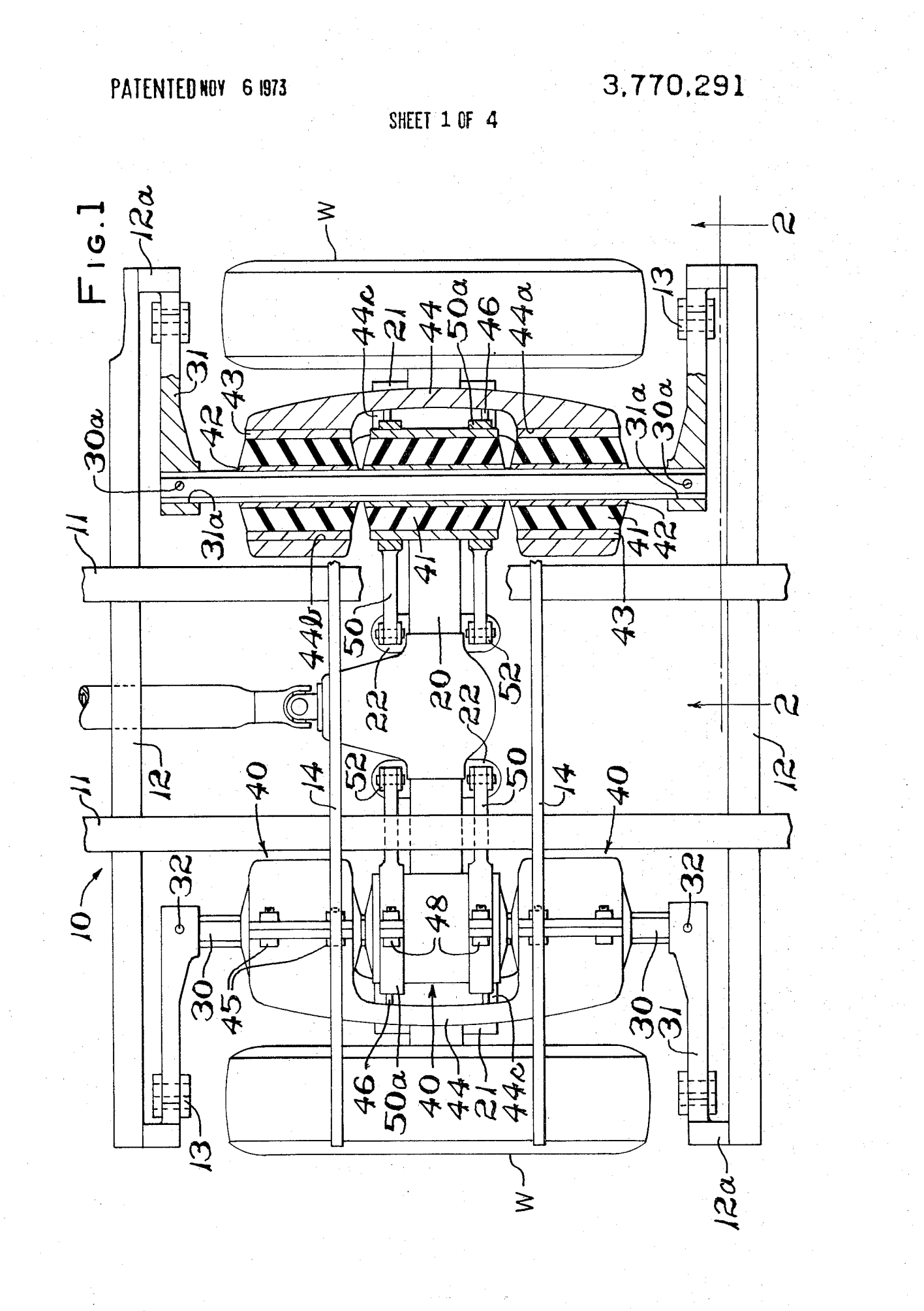
Figure 9:
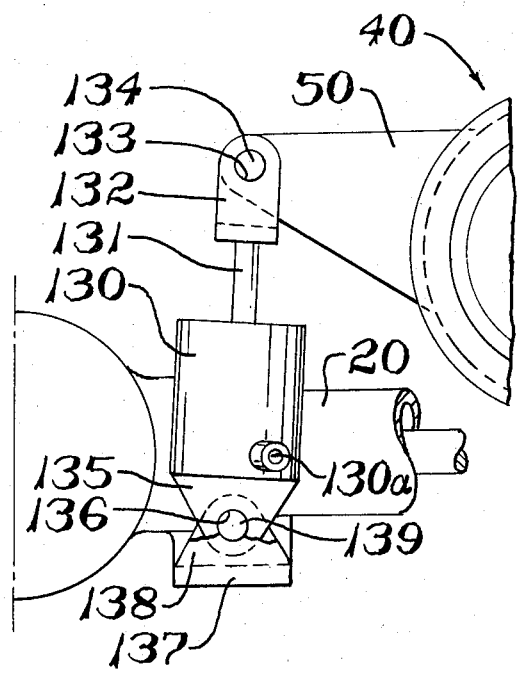
FIG. 9 is a view to FIG. 4 showing a modification.

Referring now to FIGS. 1, 2 and 3, the vehicle frame 10 is shown as having longitudinal members 11 and primary transverse members 12 with auxiliary transverse members 14 for supporting the vehicle floor. A pair of wheels W are attached to a driving axle 20 which is suspended on the vehicle frame longitudinally intermediate the primary transverse members 12. A rigid shaft 30 is disposed in longitudinally fore and aft relationship adjacent each wheel transversely between the wheel and the adjacent longitudinal frame member 11. Each shaft has holes 30a provided in the ends thereof for attaching members thereto. In the presently preferred practice of the invention, each of the shafts 30 has a polygonal transverse cross section, as, for example, hexagonal or octagonal.

An arm member 31, has a correspondingly shaped polygonal aperture 31a formed in one end thereof with the aperture 31a received over the end of the shaft and secured thereto by fastening means 32 inserted through the shaft hole 30a. The polygonal aperture 31a in each arm 31 prevents the arm for rotating with respect to shaft 30. In the presently preferred practice of the invention, each of the arms 31 extends from the shaft in cantilever mutually parallel relationship.

In the solid-axle suspension of FIG. 1, the free end of each arm 31 is pivotally attached to a shackle-link 13 and the shackle-link 13 is pivotally connected to a mounting lug 12a extending vertically downward from the transverse frame member 12.

Each shaft 30 has at least three torsion springs 40 received thereover in longitudinally spaced arrangement and each spring 40 has an elastomeric annulus 41 as the yieldable portion. In the presently preferred practice of the invention, each spring 40 has an inner shell 42 secured to the inner periphery of the elastomeric annulus 41. Each inner shell 42 has its inner periphery corresponding in shape to the polygonal transverse section of the shaft 30, and the inner shell 42 is received over the shaft 30 in a manner preventing relative rotation. Each spring 40 has an outer shell 43 rigidly attached to the outer periphery of the elastomeric annulus 41 in a manner preventing relative rotation therebetween.

Referring again to FIGS. 1, 2 and 3, the outer shells 43 in the longitudinally outer springs 40 have portions of a common arm 44 rigidly attached thereto such that rotation of the arm 44 about shaft 30 is resiliently resisted by the longitudinally outer springs 40. In the presently preferred practice of the invention, the arm 44 is attached to the outer shells 43 by providing a semi-cylindrical concave portion 44a on the free end of the arm and a complementary half-shell 44b is provided with concave portions received over the spring shells 43. Fastening means, such as bolts 45, are provided and the concave portion 44a of arm 44 thus is clamped over the spring outer shells 43 by tightening the bolts 45 in a manner which draws the portion 44a of the arm 44 and the corresponding mating half-shell 44b tightly against the outer periphery of the spring shell 43. If desired, positive locking means, as, for example, lugs 43b' and 44b' in corresponding recesses, (see FIG. 8) may be employed to assist in preventing rotation of the spring outer shell 43 with respect to the arm 44.

Referring now to FIGS. 1, 2 and 3, the free end of the common portion of the arm 44 has a pair of mounting lugs 44c formed thereon. A concave half-shell 21 is provided which is received over the axle 20 and a U-bolt 46 is received over each of the mounting lugs 44c securing the mounting lugs to the half-shell 21. Nuts 47 are threaded over the U-bolts 46, clamping the lugs 44c and the half-shell 21 together and securely over the axle 20. In the embodiment of FIG. 1, the spring assembly, including the springs 40, the shaft 30, and the arm 44, is mounted rigidly to the axle 20 and moves vertically with the wheel W rather than being mounted to the frame of a vehicle. As mentioned above, the suspension of FIG. 1 is utilized for solid-axle wheel arrangements. It will be understood that although a rear driving axle is illustrated in FIG. 1, the suspension may also be employed for a steering axle having a kingpin arrangement attached at each end of the solid axle.

Referring to FIGS. 1, 2 and 3, the center spring of the three springs 40 at each wheel, is adjustable for providing a preload and has at least one arm member 50 rigidly attached to the outer shell 43 thereof. In the preferred practice of the invention, each of the arms 50 has the end attached to the outer shell 43 formed in a concave configuration to be received over half the circumference of the outer shell 43. A corresponding semi-circular cap 50a is provided, which cap is received over the remaining half of the shell 43 and the cap 50a is secured to the arm 50 by bolts 48 which, when tightened, securely clamp the arm 50 and the cap 50a to the circumference to the center spring shell 43 in a manner preventing relative rotation of the arm 50 with respect to the outer shell of the center spring. Each of the arms 50 thus extends in cantilever from the center spring. The free end of each arm 50 has a clevis 52 pivotally attached thereto, which clevis is adjustably attached, as, for example, by a threaded connection to an anchor rod 51. A mounting bracket 22 is rigidly attached to the axle 20 in a region adjacent the springs 40 such that the anchor rod 51 from the arm 50 may be readily attached to the mounting bracket 22. In the presently preferred practice of the invention, the anchor rod 51 is received through an aperture formed in the mounting bracket 22 and a nut 53 is secured over the anchor rod and tightened against the bracket 22.

In operation, as the wheel W is moved vertically by encountering irregular surfaces traversed by the vehicle, the movement of the wheel and axle causes shaft 30 to rotate with respect to the outer shells 43 by virtue of the shaft being attached to the vehicle through the cantilevered arms 31 and shackles 13. The rotation of the shaft 30 with respect to the housings 43 is resiliently resisted by the elastomeric annular segments 41 of each of the three springs 40. However, the housing 43 of the center spring may be rotatably adjusted with respect to the static position of the shaft 30 by adjusting the length of the anchor rods 51 which rotate the arms 50 with respect to shaft 30 thereby applying a preload to the center spring. Thus, the center spring is operative to resist dynamic deflections of the supension and is further adjustable rotatably to provide a static preload to the suspension. The adjustable feature of the center spring thus enables severe static deflection of the suspension caused by heavy loading of the vehicle to be resisted and prevented by torsionally preloading the center spring.

Referring now to FIG. 4, an alternate form of attaching the center spring arms 50 to the axle is illustrated in which the free end of each of the arms 50 has a clevis 52( pivotally attached thereto with an anchor rod 51' attached to the clevis preferably by threading the rod 51' into a threaded hole in the clevis 52'. A locknut 56 is threaded onto the rod 51' for securing the rod in the clevis 52'. The free end of each of the rods 51' is slidably received through an aperture 22a' in the mounting bracket 22' provided on the axle and the rod 51' is free to move vertical in the mounting bracket aperture 22a'. In the presently preferred practice of the invention, the mounting bracket 22' is attached, as, for example, by welding, to the axle housing 20 and the anchor rod 51' extending through the aperture 21a' a substantial distance vertically downward beyond the bracket 21'. A coil spring 55 is received over each anchor rod 51' and an adjustable retainer 54, preferably a pair of lock nuts, is threaded over the end of each rod 51'. Each coil spring 55 is compressed between the retainer 54 and the mounting bracket 22' when the suspension is in the statically loaded state with the vehicle at rest. As the wheel and axle are deflected towards the vehicle body during motion of the vehicle, rotation of the arms 50, caused by torsional loads applied to the center spring, produces rotation of the arms 50 which pulls the anchor rods 51' in a direction tending to remove them from the apertures in the bracket 22'. The motion of each of the rods 51' in the aperture of bracket 22' tends to further compress the respective surrounding coil spring 55 between the retainers 54 and the bracket 22'. Thus, in the embodiment of FIG. 4, the center elastomeric spring 40 is mechanically in series with the spring 55 under static preload and under dynamic deflection of the vehicle wheel. In the embodiment of FIG. 4, if it is desired to increase the static preload of the center spring 40, each of the arms 50 is moved by moving the corresponding adjustable retainer 54 along the rod 51' to further compress the surrounding spring 55 which results in rotation of arms 50 and greater preload of both the springs 55 and the center torsion spring 40.

Referring now to FIG. 5, the invention is illustrated as employed in the independently suspended wheels, as for example, on the steering axle of a vehicle. In the embodiment of FIG. 5, the elastomeric torsion springs 70 are disposed in longitudinal spaced arrangement over a rigid shaft 80 which extends in fore-and-aft relationship adjacent the wheel to be suspended. Each of the springs 70 is similar to the springs 40 of the embodiment of FIG. 1 in that the springs 70 have an inner shell 72 rigidly non-rotatably received over the shaft 80, and each of the springs 70 further has an annulus of elastomeric material 73 received over the inner shell 72 and preferably bonded thereto in a manner preventing relative rotation therebetween. Each of the springs 70 further has an outer shell 74 received over the outer periphery of the annular elastomeric element 73 with the shells 74 attached thereto in a manner preventing relative rotation therebetween, preferably by bonding and radial compression. A housing 71 is received over each of the outer shells 74, and the housing has a mounting portion 71a which is rigidly secured to the longitudinal frame members 11 of the vehicle frame by convenient fasteners, as, for example, bolts. Thus, the embodiment of FIG. 5 differs from the embodiment of FIG. 1 in that the FIG. 5 suspension has the housings over outer shells of the springs secured to the frame of the vehicle rather than to the axle of the adjacent wheel.

Referring now to FIGS. 5 and 6, each of the wheels to be independently suspended has an upper suspension arm 90 having a bifurcated portion 90a with each leg thereof rigidly attached to the shaft 80 in a space longitudinally intermediate the springs 70. In the presently preferred practice of the invention, the bifurcated ends 90a of the suspension arm 90 are adapted to be received over half of the periphery of the shaft 80 and a half-shell cap 90b is received over the remaining half of the periphery. The half-shells 90b and the corresponding ends 90a of the arm 90 are drawn together by clamping bolts 92 which secure the suspension arm 90 rigidly to the shaft 80. In the presently preferred practice of the invention, the shaft 80 is similar to the embodiment of FIG. 1 in that the shaft 80 has a polygonal transverse cross section, as, for example, hexagonal or octagonal and the corresponding mating portions 90a of the suspension arm 90 and caps 90b are shaped correspondingly so as to interfit the polygonal surface of the shaft 80. The free end of the suspension arm 90 is pivotally attached to the axle of the wheel to be suspended, as, for example, by pivotal connection to a ball joint or to the upper end of a kingpin.

The suspension of FIG. 5 and 6 has a lower suspension arm, or member, 100 which has one end pivotally attached to the axle of the wheel to be suspended, as, for example, by means of a ball joint, or pivotal connection to the lower end of a kingpin, and the inboard end of the lower suspension arm is pivotally attached to a mounting bracket 101 rigidly attached to the longitudinal frame member 11. If a narrow type lower suspension arm is used, as in the suspension of FIG. 5, for suspension rigidity, a fore-and-aft support strut 110 is provided having the forward end pivotally attached to a mounting bracket 102 provided on the lower suspension member 100. The aft end of the shock strut 110 is pivotally and resiliently mounted to a mounting bracket 111 rigidly attached to the longitudinal frame member 11, with the shock strut 110 attached to the bracket 111 by means of a shock absorbing bushing 112.

Referring now to FIGS. 5, 6 and 7, the outer shell 74 of the center spring has rigidly attached thereto an arm 75 which has one end 75a formed concavely in a semi-cylindrical manner to be received over the half of the periphery of the center spring outer shell 74, and a corresponding retaining cap 75b having a concavely formed semi-circular portion received over the remaining half of the center spring outer shell 74. Fasteners 76, preferably bolts, are provided on the end of the arm 75a and the cap 75b to draw the end of the arm 75a and the cap 75b together and rigidly secure them over the outer shell 74 of the center spring in a manner preventing relative rotation therebetween. The arm 75 thus extends in cantilever relationship from the outer shell 74 of the center spring, which is in contrast to the outer shells of the longitudinally outer springs which have their outer shells rigidly secured to the vehicle frame member 11. The arm 75, extending from the outer shell of the center spring, has its free attached to an anchor link 77. The anchor link 77 has its lower end pivotally and adjustably attached to a lower transverse frame member 16 extending between the longitudinal frame members 11 of the vehicle.

In the presently preferred practice of the invention, the anchor link 77 extends through a slot 17a formed in an upper transverse member 17 which extends between the longitudinal frame members 11. The lower end of the anchor link 77 is preferably pivotally attached to the lower transverse frame member 16 by means of a resilient mounting bushing 78 but may also be attached to the transverse member 16 by a simple pin connection. The upper end of the anchor link 77 is received through an aperture formed in the end of the arm 75 and the upper end of the anchor link 77 is adjustably connected thereto by lock nuts 79 threaded over the ends of the anchor link 77. Thus, the free end of arm 75, attached to the outer housing of the center spring, is adjustably connected to the frame of the vehicle by the anchor link 77.

In operation, as the vehicle traverses an irregular surface, vertical motion of the wheel W causes the upper and lower suspension members 90 and 100, respectively, to rotate about their inboard pivotal mountings. The upper suspension member 90, upon vertical motion of the wheel, causes the shaft 80 to rotate in the spring 70 which rotation is resiliently resisted by an annular elastomeric element 73 in each of the torsion springs disposed along the shaft 80. The static position, or deflection, of the suspension may be changed by rotation of the arm 75 about the shaft 80 which rotation applies a preload to the center torsion spring 70. Rotation of the arm 75, attached to the housing of the center spring, is effected by adjusting the nuts 79 on the anchor link 77 thereby changing the effective length of the anchor link 77 and altering the position of the end of the arm 75 with respect to the frame and applying a preload to the center spring. Although the form of the invention employed for independent wheel suspension, as illustrated in FIGS. 5, 6 and 7, applies the torsion springs to the upper suspension arm 90, it will be readily apparent to those having ordinary skill in the art that the torsion springs may alternatively be applied instead to the lower suspension arm 100, or to both upper and lower suspension arms, the choice being determined by the desired configuration of the vehicle.

Referring now to FIG. 7, an alternative form of anchoring the end of the arm 75, attached to the housing of the center springs, is illustrated in which anchor link 77' is attached to a clevis 120 which is pivotally attached to the end of the arm 75 by means of an aperture formed therein. A retaining fastener 125, preferably in the form of a threaded nut, is provided over the end of the anchor link 77' to prevent removal of the anchor link from the clevis. The clevis 120 has a slide hole 120a formed therein, which slide hole has the anchor link 77' slidably received therethrough. The anchor link 77' has a coil spring 122 received concentrically thereover and a clevis or spade lug 123 provided on the lower end or end opposite the arm 75 of the anchor link 77', such that the coil spring 122 is compressed between clevis 123 and clevis 120 on the upper end of the anchor link. The clevis, or spade, lug 123 provided on the lower end of the anchor link 77', is pivotally attached to the lower transverse frame member 16 by pivotal connection 124. Rotation of the arm 75 thus causes the clevis 120, pivotally attached to the arm 75, to slide along the anchor link 77' compressing the spring 122. Preloading of the center torsion spring 70 is accomplished by tightening of the retaining nut 125 in a direction to shorten the effective length of the anchor link 77' by compressing the spring 122 which rotates the arm 75 in a direction to preload the center torsion spring 70.

Referring now to FIG. 8, a typical preferred form of the torsion springs 40 is shown in cross section and the spring illustrated in FIG. 8 may be employed in either the embodiment of FIG. 1 or FIG. 5 but for descriptive purposes, the members will be referred to by number with regard to the embodiment of FIG. 1. The typical spring 40, shown in FIG. 8, has the inner shell 42 formed of rigid material with the inner periphery having a shape corresponding to the polygonal shape of the shaft 30 over which the shell 42 is received such that relative rotation therebetween is not permitted. The annular elastomeric element 41 is received over the outer periphery of the inner shell 42 and is securely bonded thereto in a manner preventing relative rotation therebetween. The outer shell 43 of the spring is formed of two half-shells 43a and 43b with the half-shells leaving slots between their adjacent longitudinal edges when assembled and bonded over the elastomeric element 41 in the free state. Each of the half-shells 43a and 43b has, respectively, a lug 43a' and 43b' extending radially outwardly from the outer periphery thereof. The housing, which comprises the concave portion 44a of the arm 44 and the cap 44b, has corresponding recesses 44a' and 44b' formed therein for receiving the lugs 43a' and 43b'. When the housing comprising the concave portion 44a of the arm 44 and the cap 44b is assembled over the outer half-shells of the spring and secured thereto between fasteners 45 (not shown in FIG. 8 for clarity), the half-shells 43a and 43b are radially compressed and bonded over the elastomeric annulus 41 in a manner deforming the elastomer and forcing some of the elastomeric material radially outwardly of the longitudinal edges of the half-shells 43a and 43b. The form of the elastomeric spring illustrated in FIG. 8 thus provides portions of the elastomeric spring and portions on the outer periphery of the shells for providing positive engagement between the corresponding mating parts in a manner to aid in resisting relative rotation therebetween. However, if desired, the elastomeric spring may be made in other configuration known in the art and is not limited to the form illustrated in FIG. 8.

Referring now to FIG. 9, which is a view similar to FIG. 4, an alternate form of adjustment of the center spring 40 of the solid-axle suspension of FIG. 1 is illustrated, in which continuous adjustment of the suspension is provided for load-leveling during vehicle movement. A fluid power cylinder 130 is provided having an operating rod 131 attached to the piston of the cylinder and extend therefrom with the free end of the rod 131 connected to a clevis 132, the lugs of which each have a hole 133 provided therein. A cross-pin 134 is received through the holes 133 and through the end of arm 50 pivotally connecting the clevis 132 to the free end of the arm 50 extending from the center spring 40. The power cylinder 130 has a mounting lug 135 provided thereon, which lug has a hole 136 therethrough for mounting.

A mounting bracket 137 is rigidly attached to the axle 20 in a manner similar to bracket 22 of FIG. 2. The mounting bracket 137 has an upright flange 138 which also has a hole therethrough, and a cross-pin 139 is received through hole 138 and the hole in flange 138 pivotally mounting the cylinder to the bracket 137 and axle 20. A port 130a is provided on the power cylinder 130 for introducing pressurized fluid into the cylinder from a fluid pressure source (not illustrated) provided on the vehicle. In operation, when fluid is introduced through port 130a into cylinder 130, the operating rod 131 extends and rotates arm 50 thereby applying a torsional preload to the elastomeric spring 40. It will be understood by those skilled in the art that if desired, the fluid source may be controlled by sensors for detecting deflection of the suspension vehicle such that upon unleveling by loading or unloading the vehicle, the fluid power cylinder may be energized to preload the center spring and restore the vehicle to a level altitude.

Figure 10:
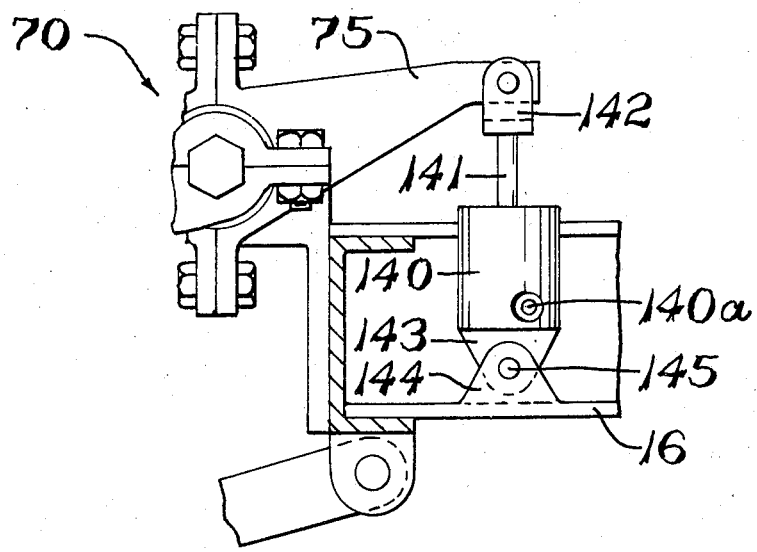
FIG. 10 is a view similar to FIG. 7 showing a modification.

Referring now to FIG. 10, which is a view similar to FIG. 7, an alternate form of adjusting or preloading the center spring of the independent suspension of FIG. 5 is shown. In the arrangement of FIG. 10, a fluid power cylinder 140 has the free end of the operating rod 141 attached to a clevis 142 which is pivotally connected to the free end of arm 75 from the center spring 70. A mounting lug 143 is provided on the power cylinder 140 and a corresponding lug 144 is provided on the lower transverse frame member 16 of the vehicle. The power cylinder is pivotally connected to the frame by a pin 145 passing through the lugs 143 and 144. A fluid port 140a is provided on cylinder 140 and is connected to a fluid pressure source (not illustrated). The operation of cylinder 140 is similar to that described above with respect to cylinder 130 of FIG. 9.

Modifications and variations of the invention will be apparent to those having ordinary skill in the art and the invention is limited only by the following claims.

I claim:
1. A vehicle suspension of the type having the weight of the vehicle supported by torsion springs comprising:
   a. shaft means adjacent each wheel of the vehicle disposed to extend generally at right angles to the axle of said wheel;
   b. at least three torsion springs non-rotatably mounted in longitudinally spaced arrangements on the said shaft means with each spring having an annulus of elastomeric material as the yieldable element;
   c. a housing means surrounding the outer periphery of each of said springs in a manner preventing relative rotation therebetween;
   d. means connecting one of said shaft and housing means to the axle of the adjacent wheel and the other of said means to the frame of the vehicle in a manner such that the weight of the vehicle and vertical movement of the wheel with respect to the vehicle are resisted by said torsion springs deflected resiliently in parallel; and
   e. one of said connections to the housing means includes an adjustment for varying the angular relationship of that housing means relative to said shaft means.

2. The suspension defined in claim 1, wherein each of said connections to said shaft means are pivotal connections adjacent the ends thereof.

3. The suspension defined in claim 1, wherein each of said connections to the axle are to said shaft means and intermediate said spring means.

4. The suspension defined in claim 1, wherein
   a. said shaft means has a polygonal transverse cross-section; and,
   b. each annulus of elastomeric material has a rigid hollow inner shell bonded to the inner periphery thereof and said inner shell has a corresponding polygonally shaped inner periphery complementary to that of said shaft means; and,
   c. each annulus of elastomeric material has an outer shell means received over the outer periphery thereof in a manner such that relative rotation therebetween is prevented.

5. The suspension defined in claim 4, wherein said outer shell means includes a pair of semi-cylindrical half-shells.

6. The suspension defined in claim 5, wherein each of said half-shells is received over said annular elastomeric element and said annular element is radially compressed in the assembled state such that portions thereof extend radially outward intermediate the longitudinal edges of said half-shells.

7. The suspension defined in claim 4, wherein
   a. each of said outer shell means includes lug means extending from the outer periphery thereof; and,
   b. said means rigidly attached to said springs includes at least one recess formed therein with said attaching means received over said outer shell means such that said lug means engages said recess.

8. A vehicle suspension of the type having the weight of the vehicle supported by torsion springs comprising:
   a. shaft means disposed longitudinally in fore-and-aft relationship adjacent each wheel of the vehicle;
   b. at least torsion springs each having an annulus of elastomeric material as the yieldable portion with the springs disposed in longitudinally spaced relationship about said shaft means with each spring having the inner periphery of the said annulus attached to said shaft means in a manner preventing relative rotation therebetween;
   c. outer shell means received over the outer periphery of each of said annular elastomeric portions and attached thereto in a manner resisting relative rotation therebetween;
   d. first arm means rigidly attached to the respective outer shell of the two torsion springs adjacent the ends of the shaft means and rigidly connected to the axle of the adjacent wheel;
   e. second arm means rigidly attached to each end of said shaft means;
   f. linkage means pivotally attaching said second arm means to the vehicle such that vertical movement of the vehicle wheel rotates said shaft means, which rotation is resisted resiliently by said springs acting in parallel;
   g. third arm means rigidly attached to the outer periphery of the housing of at least one of the torsion springs intermediate the said two springs adjacent the ends of said shaft means;

h. adjustable means pivotally connecting said third arm means to the axle of the adjacent wheel.

9. The suspension defined in claim 1, wherein the said adjustable connection includes spring means mechanically in series with said torsion springs.

10. The suspension defined in claim 1, wherein the said adjustable connection includes a fluid power cylinder means operable to continuously vary the said angular relationship.

11. A vehicle suspension of the type having the weight of the vehicle supported by torsion springs comprising:

a. shaft means disposed longitudinally in fore-and-aft relationship adjacent each wheel of the vehicle;

b. at least three torsion springs disposed in longitudinally spaced relationship about said shaft means with each spring having an annulus of elastomeric material as the yieldable portion with the inner periphery of the said annulus attached to said shaft means in a manner preventing relative rotation therebetween;

c. outer shell means received over the outer periphery of each annulus of elastomeric material and attached thereto in a manner preventing relative rotation therebetween;

d. means attaching the outer shell of each spring to the frame of the vehicle to be suspended;

e. first arm means including means rigidly attached to said shaft means in the spaces intermediate said springs such that rotation of said arm means about said shaft means is resisted resiliently in parallel by said springs;

f. means pivotally attaching said arm means to the axle of the adjacent wheel to be suspended such that vertical motion of the wheel causes rotation of said first arm means about said shaft means;

g. second arm means rigidly attached to the outer periphery of respectively the outer shell of the spring intermediate the two springs adjacent the ends of said shaft means;

h. means pivotally connecting said second arm means to the vehicle to be suspended such that vertical motion of the wheel and rotation of said shaft means is resiliently resisted by said springs;

i. adjustable means connected to said second arm means and to the vehicle frame, which adjustable means is operable to move said second arm means about said shaft means for preloading said intermediate spring.

* * * * *